United States Patent [19]
Lundgren

[11] Patent Number: 6,003,265
[45] Date of Patent: Dec. 21, 1999

[54] TRAP FOR TRAPPING AND/OR KILLING ANIMALS

[76] Inventor: Lars-Olof Lundgren, Stolmakaregatan 21, S-571 41, Nässjö, Sweden

[21] Appl. No.: 08/619,516
[22] PCT Filed: Sep. 30, 1994
[86] PCT No.: PCT/SE94/00903
   § 371 Date: May 24, 1996
   § 102(e) Date: May 24, 1996
[87] PCT Pub. No.: WO95/09531
   PCT Pub. Date: Apr. 13, 1995

[30] Foreign Application Priority Data

Oct. 1, 1993 [SE] Sweden ................................. 9303200

[51] Int. Cl.$^6$ .................................................. A01M 23/00
[52] U.S. Cl. .................................................... 43/61
[58] Field of Search ..................... 43/61, 77, 78

[56] References Cited

U.S. PATENT DOCUMENTS

| | | |
|---|---|---|
| 1,654,434 | 12/1927 | Senecal . |
| 4,144,667 | 3/1979 | Souza .......................................... 43/61 |
| 4,310,984 | 1/1982 | Brubaker, Jr. ............................... 43/61 |
| 4,393,616 | 7/1983 | Kaufman et al. ............................ 43/60 |
| 4,607,450 | 8/1986 | Kaiser et al. ................................ 43/83 |
| 5,216,829 | 6/1993 | Morton ..................................... 43/42.06 |

FOREIGN PATENT DOCUMENTS

| | | |
|---|---|---|
| 126038 | 11/1901 | Germany . |
| 593752 | 3/1934 | Germany . |

Primary Examiner—David A. Scharbel
Assistant Examiner—Anthony Ojini
Attorney, Agent, or Firm—Greenberg Traurig; Robert P. Bell

[57] ABSTRACT

A trap is described, for catching and possibly killing animals, especially small animals such as minks and the like. The trap comprises a relatively elongated cage 1 preferably formed with a bottom, side walls, and a roof made from bars. A first end wall 2 with a preferably circular first opening 4 intended to form an entrance for the animal, and a door 7 are provided, guided by guide elements 6 to take a first position with the trap activated. In the first position, opening 4 is open, and in a second position in which the trap is deactivated, the opening 4 is closed. The trap is also provided with an activation device 8, 9, and 10 provided to act upon door 7 to bring it from the first to second position with a first touching element 10 in the cage and a second end wall 3. According to the invention, the trap is primarily characterized in that it is provided with an optically readable indicator which is legible from a relatively large distance to indicate the activated or deactivated status of the trap.

20 Claims, 3 Drawing Sheets

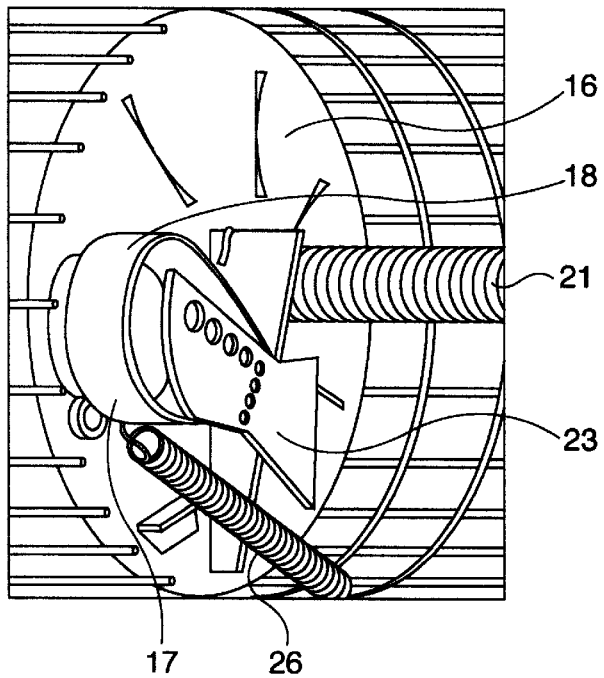
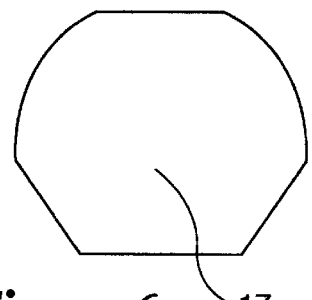
Figure 6
Figure 7
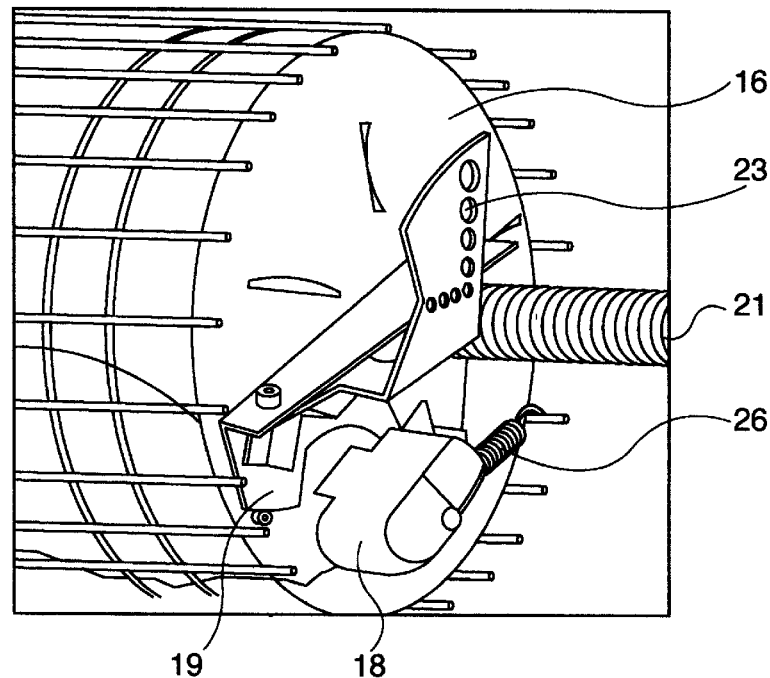
Figure 8

TRAP FOR TRAPPING AND/OR KILLING ANIMALS

FIELD OF THE INVENTION

The present invention relates to a trap for catching and possibly killing animals such as minks and the like, and also for larger animals.

BACKGROUND OF THE INVENTION

Traps for catching animals live or dead are well known in the art. For fur-trapping purposes, the prior-art jaw or "leg trap" is well known. Such traps comprise a pair of jaws tied together with a spring and triggered by an animal stepping on the trap. Once the animal steps on the trap, the jaws spring together, clamping on the animal's leg. The trap may be tied or chained to a fixed object so that the animal remains with the trap until such a time as the person setting the trap returns.

Such traps, however, as crude, ineffective, inhumane, and not very discriminating. Animal rights groups have decried such traps as cruel, as the animal is left tied to the trap for an extended period of time, in great pain (usually due to broken leg or the like) and left to slowly bleed to death. While trapped in such a trap, an animal may thrash about, damaging the fur pelt which the trapper desires. In addition, animals have been known to go so far as to chew off their own legs to escape such traps. Such traps are indiscriminate, trapping family pets (cats and dogs) as well as other undesired species (e.g., porcupines, skunks, and the like). Once killed by such a trap, an animal may be eaten by scavenger animals (e.g., wolves, vultures, or the like) damaging the valuable fur pelt.

Live animal traps, such as the well-known "Hav-A-Heart" trap are also well known in the art. Such trap generally comprise a cage-like structure with one or more hinged or sliding doors provided at one or both ends. Nastas, U.S. Pat. No. 5,199,210, issued Apr. 6, 1993, discloses one such trap. The animal is typically baited into the trap by a bait (e.g., food or the like). A trigger mechanism closes a door behind the animal once the animal is inside the cage, trapping the animal. While such live animal traps are useful to catching animals live (e.g., for relocation or the like) they may be inappropriate for fur trapping or rodent pest trapping. In particular, a trapped mink or the like may damage its valuable pelt while contained in such a cage trap.

Other traps have attempted to utilize enclosures to contain an animal while providing a killing or trapping mechanism within the enclosure. Combs, U.S. Pat. No. 4,858,373, issued Aug. 22, 1989, discloses a trap having an enclosure with a plate 14 which may be rearranged to allow animals of a selected size to enter. A capture plunger 18, when triggered, closes off entrances to the trap. A lethal plunger 17 is provided with sharpened points for apparently injuring the animal. One disadvantage of the Combs traps is that there does not appear to be any mechanism for positioning the animal such that a lethal blow is delivered with accuracy. Moreover, the numerous points of lethal plunger 17 may damage valuable pelts.

Thus, it remains a requirement in the art to provide a trap for catching and possibly killing an animal humanely and accurately, while minimizing trapping of non-target animals such as household pets and the like and minimizing damage to fur pelts.

In addition, in many animal traps used in fur trapping, it may be difficult to determine whether the trap has been sprung without closely inspecting the trap. Even from several feet away, a human may leave a scent in a trap area, discouraging target animals from approaching the trap. Thus, it remains a requirement in the art to provide a trap whose triggered status may be readily determined from a distance.

SUMMARY AND OBJECTS OF THE INVENTION

The present invention comprises a relatively elongated cage, preferably formed with a bottom, side walls and a roof made from bars, with a first wall with a preferably circular first opening forming an entrance for the animals. In the entrance, a door is provided, guided by guide elements into a first position when the trap is activated where the opening is open. When the trap is triggered (deactivated), the door is closed, guided by the guide elements into a second position.

An activator is provided to act upon the door to move it from the first (open) position to the second (closed) position. The activator comprises a first trigger element in the cage, and a second wall. The door is preferably formed as a circular plate guided by guide elements fixed to the first wall. The first (open) position of the door, with the cage activated, is preferably above the second (closed) position, with the cage deactivated (triggered).

The trap is provided with an indicator, optically readable at a relatively large distance, for indicating the activated and deactivated positions of the trap door.

In a preferred embodiment of the trap, the indicator comprises at least one first surface element, which takes a first visible position, visible from a first direction when the door is in the first (open) position, and takes a second, not visible position, when the door is in the second (closed) position.

In an alternative embodiment of the trap, the indicator comprises at least one second surface element, which takes a first visible position, visible from a second direction opposite to the first direction, when the door is in the first (open) position, and takes a second, not visible position, when the door is in the second (closed) position.

In a further alternative embodiment, the trap comprises at least one third surface element with such a form, that it can be optically easily distinguished from the first and second surface elements, for making the determination of the position of the trap in the dark easier.

In suitable embodiments of the invention, at least one of the surface elements may be made reflecting and/or fluorescent.

In one advantageous embodiment, the trap is provided with an activator comprising of a first trigger element in the form of a treading plate, pivoting at the bottom of the cage, the treading plate being connected, via a thread, to a cotter pin keeping the door in its first position. The activating pressure at the treading plate being adjustable by setting the angle between the legs of the cotter pin.

Often there is need for a killing device in the cage, suitably provided in the portion of the cage that is opposite to the opening.

In one advantageous embodiment, the killing device comprises a third, inner wall, in which there is provided a second opening, with a dimension adapted to accept the head of the animal within a certain margin. Further, a fixing clamp is provided to take a first activated position with an active portion at such a distance from the limit of the opening, that there is room for the head of the animal within the clamp.

When triggered, the fixing clamp takes a second deactivated position with the active portion acting with a certain force, so that a head of an animal can be fixed against the limit of the opening.

A hitting device is provided to take an activated first position pretensioned against a power source such as a screw spring, and a deactivated second position within the level area of the second opening, so that the hitting device may hit the head of the animal, killing it after it has been fixed by the fixing clamp. The fixing clamp and the hitting device being provided to be released at their first position, in which they have been held by a retaining device, by a second trigger element located within the area for the second opening, and able to be acted upon with a relatively small movement by one portion of the head of the animal such as its lower jaw.

If the opening is formed with side edges that converge downwardly, it may be insured that the head of the animal is placed in such a position of the clamp that the hitting device with its preferably conical point will immediately kill.

It is suitable to arrange the hitting device pivoting around a horizontal shaft, pretensionable against a screw spring, provided around the horizontal shaft.

BRIEF DESCRIPTIONS OF THE DRAWINGS

The invention shall be described more in detail in the following detailed description, reference being made to the enclosed schematical Figures.

FIG. 6 is a view of a second opening.

FIG. 7 is a perspective view of the killing device, with the trap activated.

FIG. 8 is a perspective view of the killing device, with the trap deactivated.

DETAILED DESCRIPTION OF THE INVENTION

Figure 1:
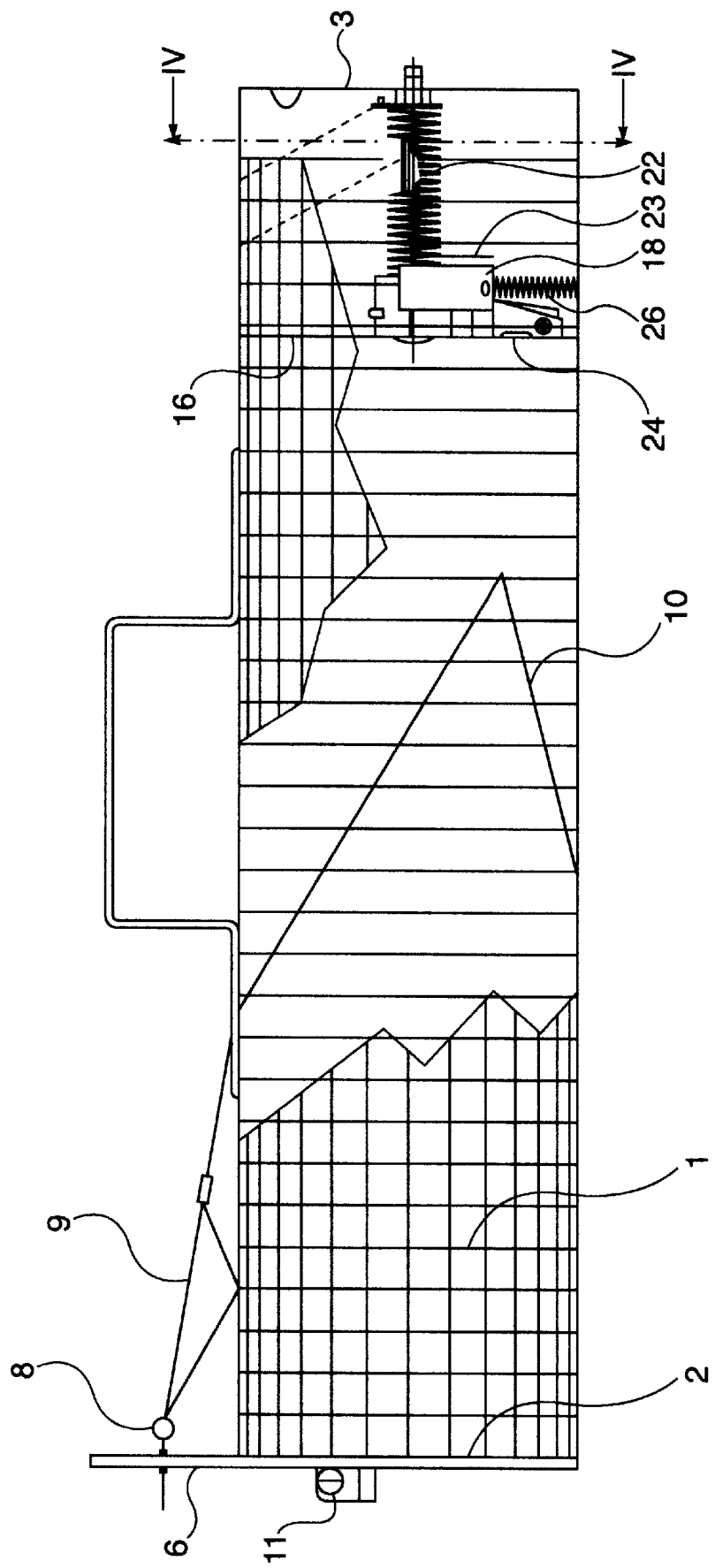
FIG. 1 is a view towards an elongated wall of a trap according to the present invention.
Figure 2:
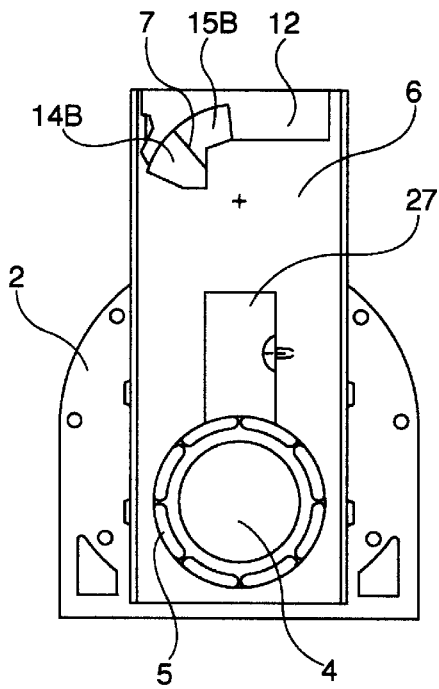
FIG. 2 is a view towards the first wall of the trap.
Figure 3:
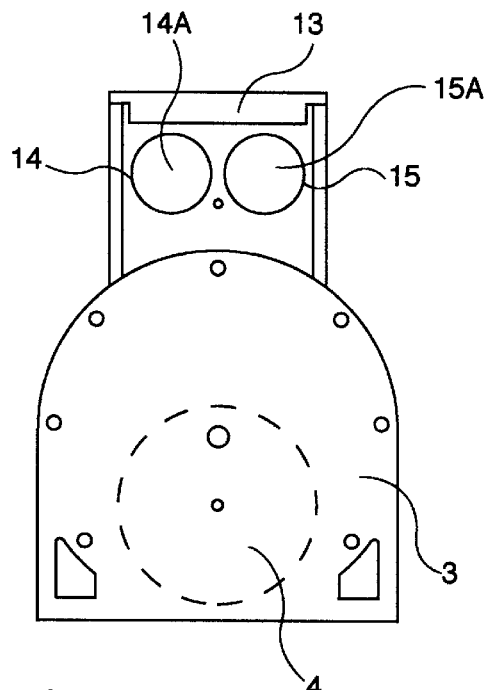
FIG. 3 is a view towards the second wall of the trap.

In FIG. 1 there is shown a relatively elongated cage 1, formed by bars. It is provided with first wall 2 and second wall 3, which are illustrated in FIGS. 2 and 3, respectively. As illustrated in FIG. 2, in first wall 2 there is a circular opening 4. A number of arched recesses 5 are formed in wall 2 with opening 4 made larger.

Double walled guide 6 is attached to first wall 2, for vertically guiding door 7 which is in the form of a circular plate. Recess 27 is formed in double walled guide 6 at its outside, so that the door may be lifted from its second (closed) position to its first (open) position. An activator comprises cotter pin 8 (FIG. 1) placed in a corresponding hole in double walled guide 6 and through a hole in the door 7 in the activated position of the trap, that is to say when the door 7 is held in a first position.

The activator also comprises thread 9 connected to a first trigger in the form of treading plate 10 pivoted at the floor of cage 1. Thus, the activator functions in such a way, that when the animal enters cage 1 and presses down treading plate 10 with its weight, cotter pin 8 is drawn by thread 9 from its position, so that door 7 falls down by gravity and takes a second, deactivated (closed) position.

Alternately, treading plate 10 may be omitted, and thread 9 may be fastened directly to the floor of cage 1. As door 7 is circular there is no risk that it shall bind to double walled guide 6. There is provided a lock 11 (FIG. 1) for locking door 7 in its second (closed) position.

As illustrated in FIGS. 2 and 3, trap 1 may be provided with two rectangular surface elements 12 and 13, suitably white, which make finding trap 1 in the dark easier. By providing such surface elements at both sides of the upper portion of the guide 6, finding trap 1 is made appreciably easier. At the side of double-walled guide 6, that is turned to cage 1, two holes 14 and 15 are provided in the upper portion, circular in the embodiment shown, but of course other forms may be considered.

One side of door 7, turned to these holes may be made reflective, (e.g., with red color 14A and fluorescent color 15A). In this embodiment, it may be seen in daylight, from the fluorescent color 15A indication in holes 14 and 15, that the trap is activated, and by night by seeing the red reflective color 14A in holes 14 and 15 an indication showing that trap 1 is activated.

Door 7 in this embodiment may be provided at one side with red color 14B and fluorescent color 15B. When door 7 falls down when trap 1 is triggered, fields 14B and 15B become visible through hole 4 in the direction towards door 7.

Figure 5:
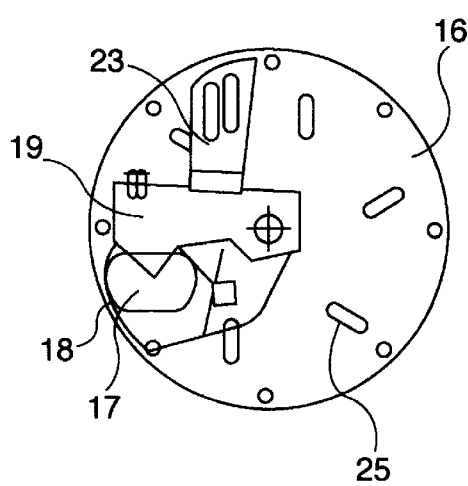
FIG. 5 is a view in the same direction as in FIG. 4, but with the trap deactivated.
Figure 4:
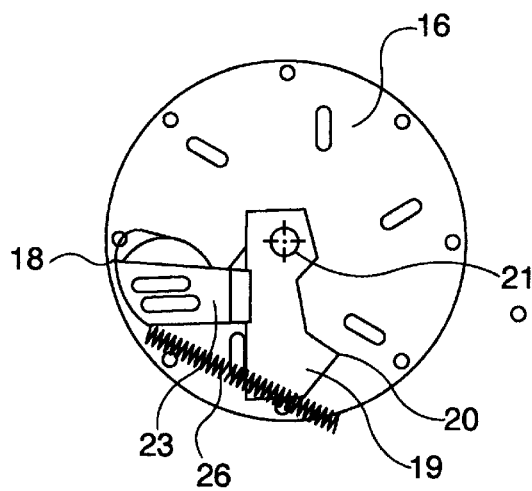
FIG. 4 is a view in the direction IV—IV in FIG. 1 with the trap activated.

In FIG. 1 there is illustrated a third wall 16, provided within cage 1 in the vicinity of second wall 3. Third wall 16 forms part of a killing device, and a second opening 17 is provided in third wall 16, as is illustrated in FIGS. 4 and 5. The killing device is illustrated in an activated (set) position in FIGS. 1, 4 and 7, and in deactivated (triggered) position in FIGS. 5 and 8.

Second opening 17 is sized to accept the head of a caught animal. In FIG. 6, a preferred embodiment of this opening is illustrated, with side edges, converging downwardly, such that the jaw of an animal fits and is fixed in the opening.

Fixing clamp 18 is provided, fixed to third wall 16, illustrated in an activated (set) first position as in FIGS. 1, 4 and 7 and a deactivated (triggered) position as in FIGS. 5 and 8. In the activated position, an animal can put its head through opening 17 and into fixing clamp 18 in its activated position. In the deactivated position, fixing clamp 18, aided by spring 26 attached to the bottom of cage 1 presses the head of the animal against the lower portion of the second opening 17.

A hitting device in the form of hit arm 19 with a preferably conical point 20 pivots around a horizontal shaft 21, which is mounted in bearings in the second and third walls 3 and 16, respectively. Hit arm 19 may be pretensioned to an activated position against screw spring 22. Fixing clamp 18 and hit arm 19 are kept in their activated positions by a retaining device, in the form of a plate tongue 24, inserted into one of a number of oval holes 25 in third wall 16.

Plate tongue 24 is connected to activating arm 23, which in activated position covers second opening 17, being able to be acted upon by a relatively small force by a portion of the head of the animal such as its lower jaw. The function is thus, that the animal, by touching activating arm 23 firstly brings fixing clamp 18 to lock its head against the lower portion of the opening 17, whereupon hit arm 19 hits the head of the animal, killing it.

By suitably forming opening 17, as illustrated in FIG. 6, the head of the animal will be fixed in such a position that hit arm 19 with its conical portion will hit in the middle of the head of the animal, whereby the killing will be efficient considering the form of the cranium of the animal, in many cases with a ridge in direct connection to the brain. It is of course perfectly possible to form the killing device so that the hit arm will hit from another direction than that shown in the Figures, that is to say optionally from above, from below or from a side, but the embodiment shown has provided to be suitable and efficient. Spring 26 may also be arranged to give hit arm 19 a certain predetermined starting speed.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

While the preferred embodiment and various alternative embodiments of the invention have been disclosed and described in detail herein, it may be apparent to those skilled in the art that various changes in form and detail may be made therein without departing from the spirit and scope thereof.

I claim:

1. An animal trap comprising:
   an enclosure;
   a first opening provided in an external wall of the enclosure, said first opening having a predetermined size so as to admit an animal to be trapped;
   a door provided to close said first opening;
   a first trigger, coupled to the door, for allowing the door to close when an animal enters the enclosure;
   a second opening provided in a wall of the enclosure, the second opening having a predetermined size to as to admit a head of the animal to be trapped;
   a gripping means, coupled to the second opening, for gripping the head of the animal when placed through the opening; and
   a hitting means, coupled to the gripping means, for hitting the animal on the head once the head of the animal is gripped by the gripping means.

2. The animal trap of claim 1, wherein said second opening comprises an opening having a tapering lower portion so as to cooperate with the gripping means to grip the head of the animal in a predetermined orientation.

3. The animal trap of claim 2, wherein said second opening is formed on an internal wall of the enclosure.

4. The animal trap of claim 3, further comprising a second trigger, coupled to the gripping means and the hitting means, for actuating the gripping means and the hitting means when the head of the animal is placed through the second opening.

5. The animal trap of claim 4 wherein the hitting means comprises a conical pointed element for engaging the head of the animal so as to force a portion of cranium into animal brain.

6. The animal trap of claim 1, wherein the door comprises:
   first and second parallel surfaces arranged to form channels for slidably accepting the door so as to allow the door to slid over the first opening.

7. The animal trap of claim 6, wherein the first and second parallel surfaces are arranged to form channels holding the door in a first position above the first opening so as to allow the door to slide downward, when triggered, over the first opening.

8. The animal trap of claim 7, wherein the first trigger comprises a pin placed through at least one of the first and second parallel surfaces to as to retain the door above the first opening.

9. The animal trap of claim 8, wherein the first trigger further comprises a plate pivotally mounted to the enclosure, for engagement with the animal, the plate being coupled to the pin so as to slide the pin when the animal enters the enclosure so as to release the door.

10. The animal trap of claim 9, wherein the door comprises a circular door slidably mounted between the first and second parallel surfaces.

11. The animal trap of claim 10, wherein at least one of the first and second parallel surfaces includes at least one open portion to allow viewing of the door when the door is placed above the first opening.

12. The animal trap of claim 11, wherein the door includes at least a reflective portion for reflecting light through the at least one open portion when the door is placed above the first opening so as to indicate the untriggered status of the trap.

13. The animal trap of claim 11, wherein the door includes at least a fluorescent colored portion visible through the at least one open portion from a substantial distance when the door is placed above the first opening so as to indicate the untriggered status of the trap.

14. An animal trap comprising:
   an enclosure;
   a first opening provided in an external wall of the enclosure, said first opening having a predetermined size so as to admit an animal to be trapped;
   a door provided to close said first opening, said door including first and second parallel surfaces arranged to form channels for slidably accepting the door so as to allow the door to slide over the first opening, wherein the first and second parallel surfaces are arranged to form channels holding the door in a first position above the first opening so as to allow the door to slide downward, when triggered, over the first opening; and
   a first trigger, coupled to the door, for allowing the door to close when an animal enters the enclosure,
   wherein at least one of the first and second parallel surfaces includes at least one open portion to allow viewing of the door when the door is placed above the first opening, and
   wherein the door includes at least a reflective portion for reflecting light through the at least one open portion when the door is placed above the first opening so as to indicate the status of the trap.

15. An animal trap comprising:
   an enclosure;
   a first opening provided in an external wall of the enclosure, said first opening having a predetermined size so as to admit an animal to be trapped;
   a door provided to close said first opening, said door including first and second parallel surfaces arranged to form channels for slidably accepting the door so as to allow the door to slide over the first opening, wherein the first and second parallel surfaces are arranged to form channels holding the door in a first position above the first opening so as to allow the door to slide downward, when triggered, over the first opening; and
   a first trigger, coupled to the door, for allowing the door to close when an animal enters the enclosure,
   wherein at least one of the first and second parallel surfaces includes at least one open portion to allow viewing of the door when the door is placed above the first opening, and wherein the door includes at least a fluorescent colored portion visible through the at least one open portion from a substantial distance when the door is placed above the first opening so as to indicate the status of the trap.

16. The animal trap comprising:

an enclosure;

a first opening provided in an external wall of the enclosure, said first opening having a predetermined size so as to admit an animal to be trapped;

a door provided to close said first opening, said door including first and second parallel surfaces arranged to form channels for slidably accepting the door so as to allow the door to slide over the first opening, wherein the first and second parallel surfaces are arranged to form channels holding the door in a first position above the first opening so as to allow the door to slide downward, when triggered, over the first opening; and a first trigger, coupled to the door, for allowing the door to close when an animal enters the enclosure, a second opening provided in a wall of the enclosure, the second opening having a predetermined size to as to admit a head of the animal to be trapped;

a gripping means, coupled to the second opening, for gripping the head of the animal when placed through the opening; and a hitting means, coupled to the gripping means, for hitting the animal on the head once the head of the animal is gripped by the gripping means.

17. The animal trap of claim 16, wherein said second opening comprises an opening having a tapering lower portion so as to cooperate with the gripping means to grip the head of the animal in a predetermined orientation.

18. The animal trap of claim 17, wherein said second opening is formed on an internal wall of the enclosure.

19. The animal trap of claim 18, further comprising a second trigger, coupled to the gripping means and the hitting means, for actuating the gripping means and the hitting means when the head of the animal is placed through the second opening.

20. The animal trap of claim 19 wherein the hitting means comprises a conical pointed element for engaging the head of the animal so as to force a portion of cranium into animal brain.

* * * * *